(12) United States Patent
Bole et al.

(10) Patent No.: US 6,422,470 B1
(45) Date of Patent: Jul. 23, 2002

(54) PROCESS FOR SECURE PROCESSING OF A SENSITIVE LOGICAL ELEMENT IN A STORAGE REGISTER, AND SECURITY MODULE IMPLEMENTING THIS PROCESS

(75) Inventors: Benoît Bole, Versailles; Jean-Luc Salles, Boulogne Billancourt, both of (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/502,573

(22) Filed: Feb. 11, 2000

(30) Foreign Application Priority Data

Feb. 11, 1999 (FR) ............................................. 99 01651

(51) Int. Cl.⁷ ............................................. G06K 19/00
(52) U.S. Cl. ........................... 235/487; 235/492; 705/64
(58) Field of Search .................................. 235/379, 380, 235/487, 492; 380/239, 240, 258; 705/57, 64, 71; 709/229

(56) References Cited

U.S. PATENT DOCUMENTS

| | | | | |
|---|---|---|---|---|
| 4,123,747 A | * | 10/1978 | Lancto et al. | 235/380 |
| 4,255,811 A | * | 3/1981 | Adler | 380/37 |
| 4,382,278 A | * | 5/1983 | Appelt | 711/122 |
| 4,908,499 A | * | 3/1990 | Guion | 235/380 |

FOREIGN PATENT DOCUMENTS

| | | | |
|---|---|---|---|
| EP | 055 128 | * | 6/1982 |
| EP | 0283927 | * | 9/1988 |
| EP | 303752 | * | 2/1989 |
| FR | 2 522 850 A | | 9/1983 |
| FR | 2 608 809 A | | 6/1988 |
| FR | 2 659 768 A | | 9/1991 |

* cited by examiner

*Primary Examiner*—Michael G. Lee
*Assistant Examiner*—Diane I. Lee
(74) *Attorney, Agent, or Firm*—Miles & Stockbridge P.C.; Edward J. Kondracki

(57) ABSTRACT

The invention relates to a process for the secure processing of a sensitive logical element (S2) in a storage register (30) containing several words (31–38), each formed of several logical elements (L1–L8, S1–S8). The process comprises:

defining a first auxiliary word containing several logical elements randomly defining the position of a sensitive word (36) among the words of the storage register, which is intended to store the sensitive logical element (S2), and within the sensitive word, the position of the sensitive logical element among the logical elements of the sensitive word, the other words (31–35, 37, 38) of the storage register constituting decoy words; and using the first auxiliary word to select the sensitive word (36) and storing the sensitive logical element (S2) in its position within the sensitive word.

6 Claims, 4 Drawing Sheets

PROCESS FOR SECURE PROCESSING OF A SENSITIVE LOGICAL ELEMENT IN A STORAGE REGISTER, AND SECURITY MODULE IMPLEMENTING THIS PROCESS

FIELD OF THE INVENTION

The invention relates to a process for the secure processing of a sensitive logical element in a storage register containing several words, each formed of several logical elements, and a security module implementing this process.

DESCRIPTION OF RELATED ART

The term "security module" should be understood either in its conventional sense, in which it designates a device whose purpose in a communication or information network is to be held by an authority supervising the network and to store, in protected fashion, secret and fundamental parameters of the network such as cryptographic keys, or more simply, as designating a device allocated to various users of the network allowing each of them to have access to the latter, this latter device also being capable of holding secret parameters. The security module could take the form of a portable object of the chip card type.

It is known that a hacker is capable or reading or altering information contained in the information storage means of a security module, particularly in the memories of electronic chips, using an electronic microscope or radiation producing means, depending on the circumstance. He can also deduce certain information by carefully studying the electric current consumption of the information storage means. However, in order to be effective, he must not only access the stored information, but also identify the function of this information in the operation of the security module.

In the known art, the information is stored in the storage means at dedicated and immutable locations. The result is that a hacker is capable in certain cases of discovering the presence of a piece of information that is always the same at a given location, and of connecting this information with a particular function. He can then knowledgeably affect the execution of the process in the security module.

SUMMARY OF THE INVENTION

The primary object of the invention is to offer a process for the secure processing of a sensitive logical element in a storage register that makes it much more difficult to discover the function assigned to this sensitive logical element.

To this end, the process according to the invention is characterized in that it comprises the steps consisting of:
  defining a first auxiliary word containing several logical elements randomly defining the position of a sensitive word among the words of the storage register, which is intended to store said sensitive logical element, and within this sensitive word, the position of the sensitive logical element among the logical elements of this word, the other words of the storage register constituting decoy words;
  using the first auxiliary word to select said sensitive word and to store the sensitive logical element in its position within this sensitive word.

According to an improvement, the process according to the invention is characterized in that it comprises the steps consisting of:
  defining a first auxiliary word containing several logical elements randomly defining the position of a sensitive word among the words of the storage register, which is intended to store said sensitive logical element, and within this sensitive word, the position of the sensitive logical element among the logical elements of this word, the other words of the storage register constituting decoy words;
  defining a second auxiliary word containing several logical elements randomly defining, for each decoy word in particular, the position of a decoy logical element among the logical elements of this word;
  successively considering each of the words of the storage register and randomly assigning for this word a value to the logical elements of the second auxiliary word, and in the event that this word is a decoy word, using the second auxiliary word to store the decoy logical element in its position, and in the event that this word is the sensitive word, using the first auxiliary word to store the sensitive logical element in its position.

BRIEF DESCRIPTION OF THE DRAWINGS

Other details and advantages of the present invention will emerge from the following description of a preferred but non-limiting embodiment, in reference to the attached drawings in which.

DESCRIPTION OF THE PREFERRED EMBODIMENT(S)

Figure 1:
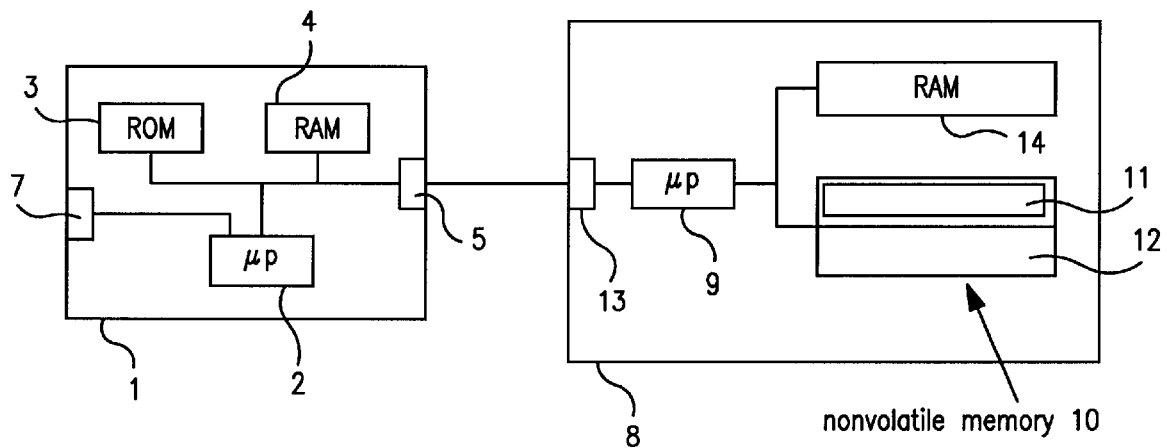
FIG. 1 represents a data processing device that cooperates with a security module.

FIG. 1 represents a data processing device 1 that cooperates with a security module in the form of a portable object 8. The data processing device comprises, in a way that is known per se, a microprocessor 2 to which are connected a memory ROM 3 and a memory RAM 4, means 5 for cooperating, with or without physical contact, with the portable object 8, and a transmission interface 7 that allows the data processing device to communicate with a data communication network. The data processing device 1 can also be equipped with storage means such as diskettes or disks that may or may not be removable, entry means (such as a keyboard and/or a pointing device of the mouse type) and display means, these various means not being represented in FIG. 1

The data processing device can be constituted by any computing device installed at a private or public site and capable of providing the means for managing information or delivering various goods or services, this device being permanently installed or portable. It can also be a device dedicated to telecommunications.

In addition, the portable object 8 carries a chip that includes information processing means 9, a nonvolatile memory 10, a volatile working memory RAM 14, and means 13 for cooperating with the data processing device 1. This chip is laid out so as to define, in the memory 10, a secret area 11 in which information, once recorded, is inaccessible from outside the chip and only accessible to the processing means 9, and an accessible area 12 that is made accessible from outside the chip through the microprocessor 9 for reading and/or writing information. Each area of the nonvolatile memory 10 can comprise a part that is not modifiable ROM and a part that is modifiable EPROM, EEPROM or constituted by a RAM of the "flash" type or a FRAM (the latter being a ferromagnetic RAM), i.e, having the characteristics of an EEPROM but with access times identical to those of a conventional RAM.

For the chip, it is possible to use a self-programmable microprocessor with a nonvolatile memory, as described in U.S. Pat. No. 4,382,279 in the name of the Applicant. As indicated in column 1, lines 13–25 of this patent, the self-programmable feature of the chip corresponds to the capability for a program fi located in a ROM to change another program fj located in a programmable memory into a program gj. In a variant, the microprocessor of the chip is replaced—or at least supplemented—by logic circuits installed in a semiconductor chip. In essence, such circuits are capable of performing calculations, particularly authentication and signature calculations, as a result of their hardwired, rather than microprogrammed, logic. They can particularly be of the ASIC ("Application Specific Integrated Circuit") type. Advantageously, the chip will be designed in monolithic form.

Figure 2:
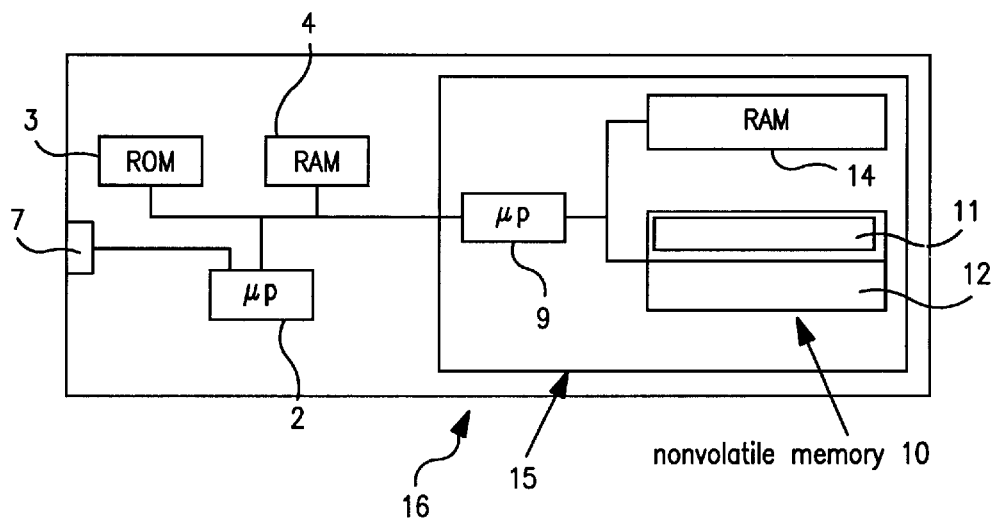
FIG. 2 represents a variant of FIG. 1.

A variant of FIG. 1 is illustrated in FIG. 2, in which the data processing device 16 comprises, in addition to the elements of the data processing device 1 of FIG. 1, those of the portable object 8 disposed in a security module 15, the elements common to both FIGS. 1 and 2 having the same references. However, the cooperation means 5, 13 of FIG. 1 are replaced by a permanent link between the microprocessor 2 and the microprocessor 9.

According to a variant of FIG. 2, the data processing device is constituted by the security module 15 of FIG. 2 itself.

Figure 3:
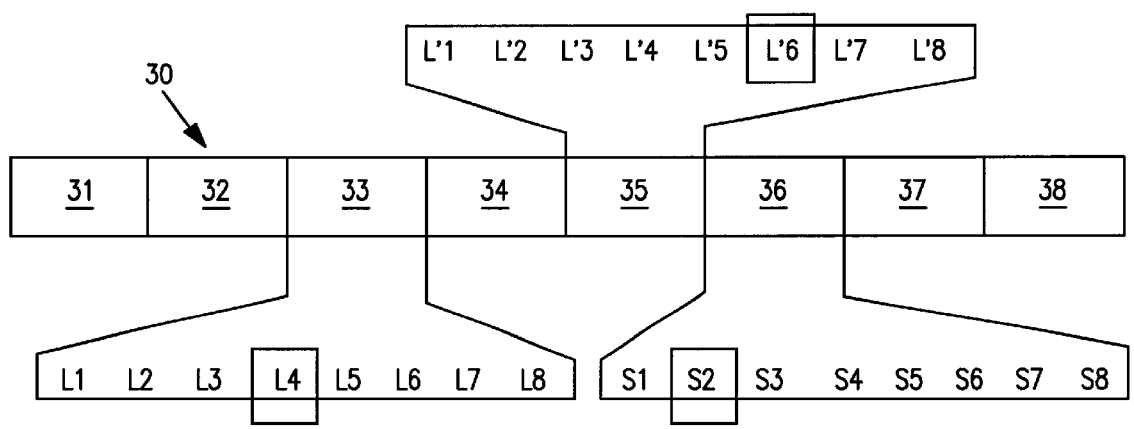
FIG. 3 represents the way in which the information contained in a storage register is processed according to the invention.

FIG. 3 represents a register 30 of the volatile memory RAM 14 of the above-mentioned security module, intended to store a set of eight bytes 31 through 38, which may or may not be contiguous. It comprises one byte 36 that is said to be "sensitive" because it incorporates a sensitive bit S2 to be protected within a set of eight bits S1 through S8, and seven bytes (31 through 35, 37, 38) called "decoys" because they are intended to mask the presence of the sensitive bit 36. Each decoy byte includes eight bits, including a bit called a "decoy" because it is intended to mask the presence of the sensitive bit S2: in this example, the byte 33 comprises eight bits L1 through L8, its decoy bit being L4. The byte 35 comprises eight bits L'1 through L'8, its decoy bit being L'6.

Figure 4:
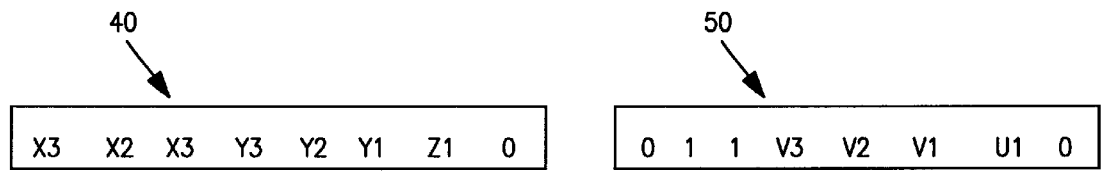
FIGS. 4 and 5 represent two words indicating the organization of the information in the storage register of FIG. 3.

FIG. 4 represents a byte 40 called a "security" byte, because it is intended to protect the sensitive byte 36. It comprises three first bits X3, X2, X1 defining a position of the sensitive byte among the eight bytes of the register 30. In this case, these bits equal 1, 0, 1, or the sixth position. It then comprises three other bits Y3, Y2, Y1 defining a position of the sensitive bit S2 among the eight bits of the byte 36. In this case, these bits equal 0, 0, 1, or the second position. Finally a last significant bit Z1 indicates whether or not the stored value of the sensitive bit S2 is complemented, i.e., whether this value corresponds to the binary complement (0 or 1) of its real value (1 or 0), or to the real value itself (1 or 0). A last insignificant bit (in this case 0) is not used.

Figure 5:
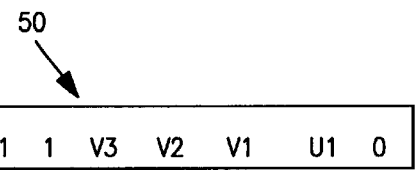

FIG. 5 represents a last byte 50 called a "masking" byte because it is intended to define the masking of the sensitive bit 52 by means of decoy bits such as L4 and L'6. It comprises any three first insignificant bits 0,1,1 followed by three bits V3, V2, V1 defining, for each decoy byte in particular, a position of the decoy bit within the decoy byte in question: for the byte 33, this position is 0, 1, 1, or the fourth position. It also comprises a seventh bit U1 that indicates whether or not the real value of the decoy bit is complemented. Finally, it comprises an eighth insignificant bit 0. It will be noted that these bits V3, V2, V1, U1 occupy the same respective position in the masking byte 50 as the bits Y3, Y2, Y1, Z1 in the security byte 30 having the same function, in order to maintain operational symmetry.

Figure 6:
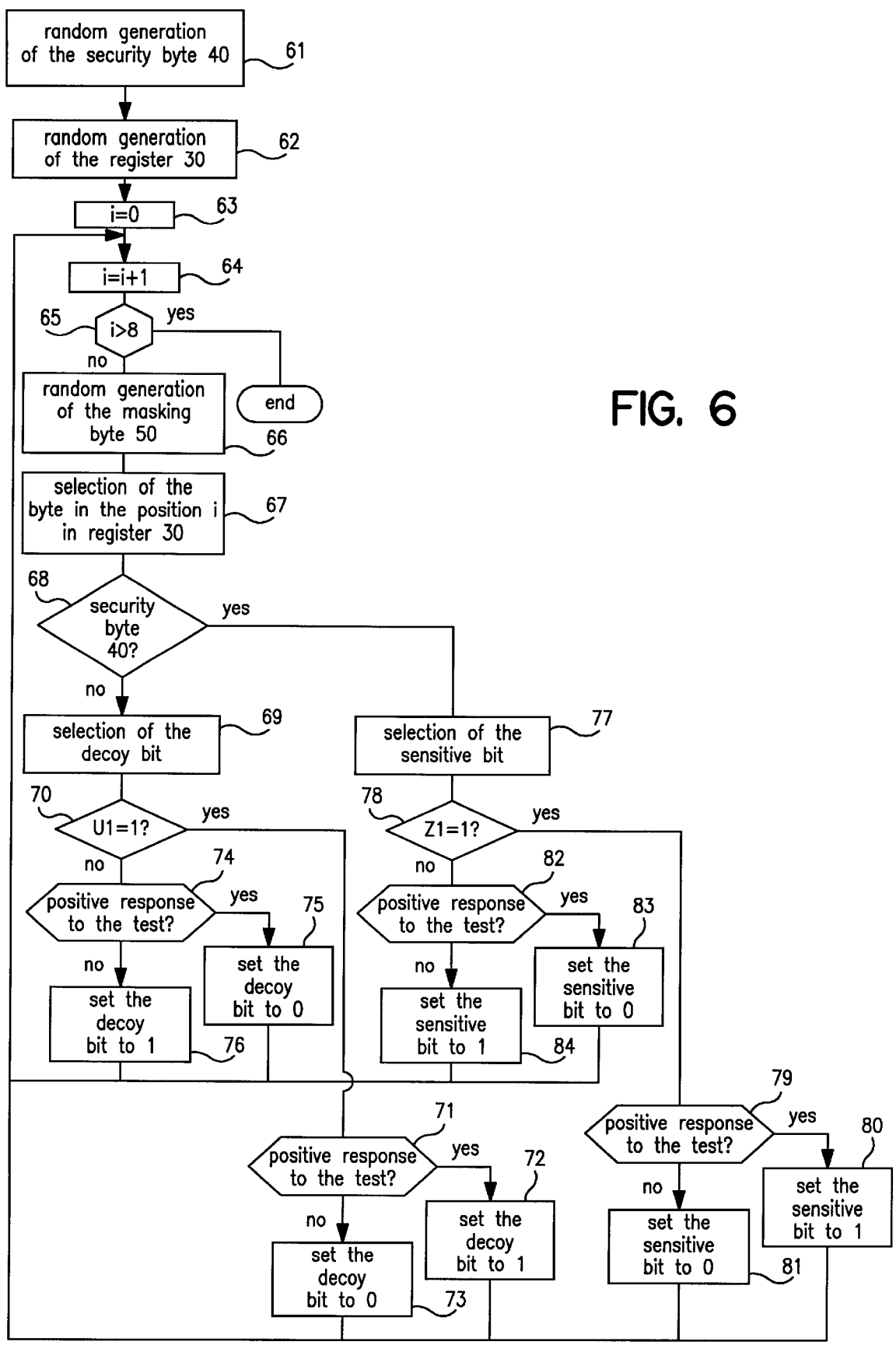
FIG. 6 is a flow chart of an operation for writing a sensitive logical element into the storage register of FIG. 3.

In operation, the microprocessor performs a writing of the sensitive bit S2 into volatile memory RAM 14 according to the flow chart of FIG. 6. The microprocessor begins by randomly generating the security byte 40 using a random generator that is known per se and provided in hardware or software form in the security module (step 61). This defines the sensitive byte 36, the sensitive bit S2, and whether or not the latter is complemented. The microprocessor then randomly generates the eight bits of the register 30 (step 62). It then successively processes the eight bits of the register 30 by initializing a variable i with the value 0 (step 63), incrementing it by one unit (step 64), then determining whether i is greater than eight (step 65). If so, this means that all the bytes of the register 30 have been processed, and that the end of the writing process has been reached. If not, the microprocessor randomly generates the masking byte 50 (step 66). The microprocessor then selects the byte in the position i in the register 30 (step 67). The microprocessor then analyzes whether or not the byte selected is the security byte 40 (step 68): to do this, it uses the bits X3, X2, X1 of the security byte 40.

If it is not, the byte in position i is therefore a decoy byte and the microprocessor selects the decoy bit in this decoy byte (step 69); to do this, it uses the bits V3, V2, V1 of the masking byte 50. Next, the microprocessor analyzes the value of the bit U1 of the masking byte 50. If it is equal to 1, the microprocessor performs a first processing of the response to a test (step 71), which response takes the form of setting the decoy bit to 0 or to 1. In the event of a positive response and in accordance with an arbitrarily chosen convention, the microprocessor sets the decoy bit to 1 (step 72). Naturally, an inverse convention could be applied, in which case a positive response would correspond to setting the decoy bit to zero. In the event of a negative response, the microprocessor sets the decoy bit to zero (step 73).

If, on the other hand, the bit U1 equals zero in step 70, the microprocessor performs a second processing of the response to the test, inverse to the first processing. Thus, upon a positive response to the test (step 74), the microprocessor sets the decoy bit to 0 (step 75), while in the event of a negative response, it sets it to 1 (step 76).

In the event that the response to the test 68 is positive, the byte in the position i is therefore the security byte 40, and the microprocessor selects the sensitive bit S2 within this sensitive byte (step 77); to do this, it uses the bits Y3, Y2, Y1 of the security byte 40. Next, the microprocessor analyzes the value of the bit Z1 of the security byte 40. If it is equal to 1, the microprocessor performs a first processing of the response to a test (step 79), which response takes the form of setting the sensitive bit S2 to zero or to 1. In the event of a positive response, and in accordance with the convention mentioned above, the microprocessor sets the sensitive bit S2 to 1 (step 80). In the event of a negative response, the microprocessor sets the sensitive bit S2 to zero (step 81).

If, on the other hand, the bit Z1 equals 0 in step 78, the microprocessor performs a second processing of the response to the test, inverse to the first processing. Thus, upon a positive response to the test (step 82), the microprocessor sets the sensitive bit S2 to 0 (step 83), while in the event of a negative response, it sets it to 1 (step 84).

After setting the sensitive bit S2 or the decoy bit to 1 or to 0 in accordance with steps 72, 73, 75, 76, 80, 81, 83, 84, the microprocessor goes back to step 65 in order to process the next byte of the register 30.

Figure 7:
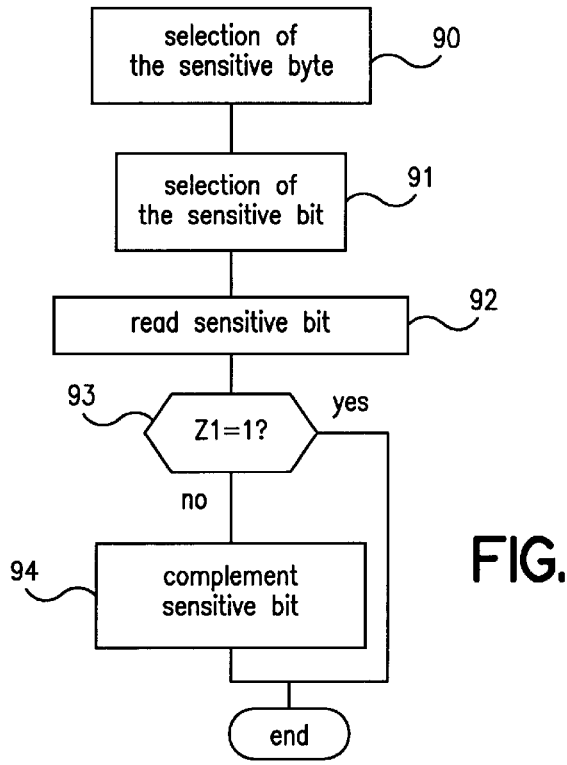
FIG. 7 is a flow chart of an operation for reading a sensitive logical element in the storage register of FIG. 3.

After the process for writing the sensitive bit S2 and the decoy bits of the L4 or L'6 type, the microprocessor typically performs a certain number of tasks before having to read the sensitive bit S2. During this reading (FIG. 7), it begins by selecting the sensitive byte 36 among the various bytes of the register 30 by reading the contents of the bits X3, X2, X1 of the security byte 40 (step 90), then it selects the sensitive bit S2 by reading the bits Y3, Y2, Y1 (step 91). The microprocessor can now read the sensitive bit S2 (step 92). Next, it analyzes the value of the bit Z1: in the event that Z1=1, the microprocessor does not modify the read value of the sensitive bit S2; on the other hand, in the event that Z1=0, it complements the read value of the sensitive bit S2, i.e., it takes its binary complement (if the read value is 0, it takes the value 1, and if the read value is 1, it takes the value 0). The operation for reading the sensitive bit S2 is then finished.

It will be noted that during the reading of the sensitive bit S2, unlike in the write operation, no parallel processing of the decoy bits is performed (it would have been conceivable to read each of the decoy bits). Although this is conceivable, the read operation presents far less risk of giving information to a hacker than the write operation if the processing of the decoy bits is eliminated.

According to a variant of embodiment of the invention, the process described above is applied not only to the protection of a sensitive bit S2 within a byte, but to that of an n-bit word S'2 (for example an eight-bit byte) within a sensitive group 36' of m n-bit words S'1 through S'8, itself hidden in a set of p groups of decoy words (31' through 35', 37', 38').

According to another variant of embodiment, no decoy bits in the decoy bytes are manipulated, and the sensitive bit is simply hidden in the sensitive byte, and the sensitive byte is hidden among the decoy bytes. In this case, the masking byte is not used.

According to another variant of embodiment, the capability to complement the sensitive bit is not provided.

According to another variant of embodiment, the storage register storing the sensitive byte and the decoy bytes is located not in volatile memory RAM, but in EEPROM, so that what is protected is no longer the reading and writing of a sensitive bit into RAM, but into EEPROM.

Figures 8, 9:
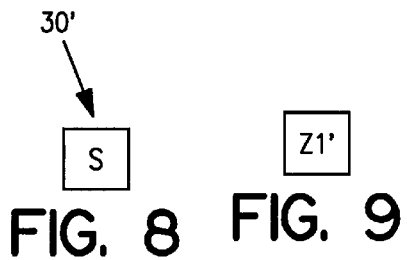
FIGS. 8 and 9 represent two respective variants of FIGS. 3 and 4.
Figure 11:
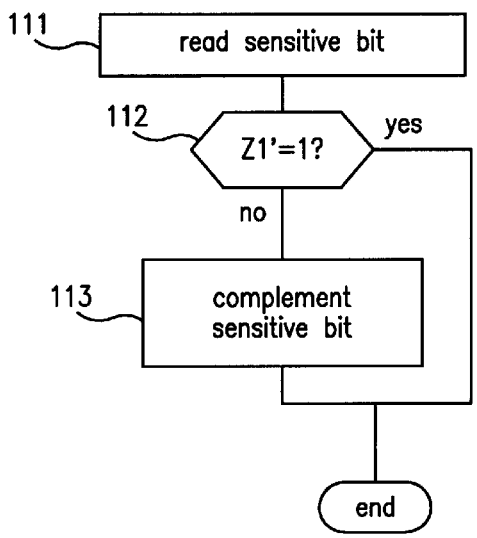
FIG. 11 is a flow chart of an operation for reading a sensitive logical element into the storage register of FIG. 8.

A main variant of embodiment of the invention uses a register 30' (FIG. 8) that stores only one bit, i.e., a sensitive bit S, and the only way to protect this sensitive bit S is therefore to provide the capability to complement it. This variant defines a security bit 71' (FIG. 9) whose value makes it possible to know whether or not the sensitive bit S should be complemented.

Figure 10:
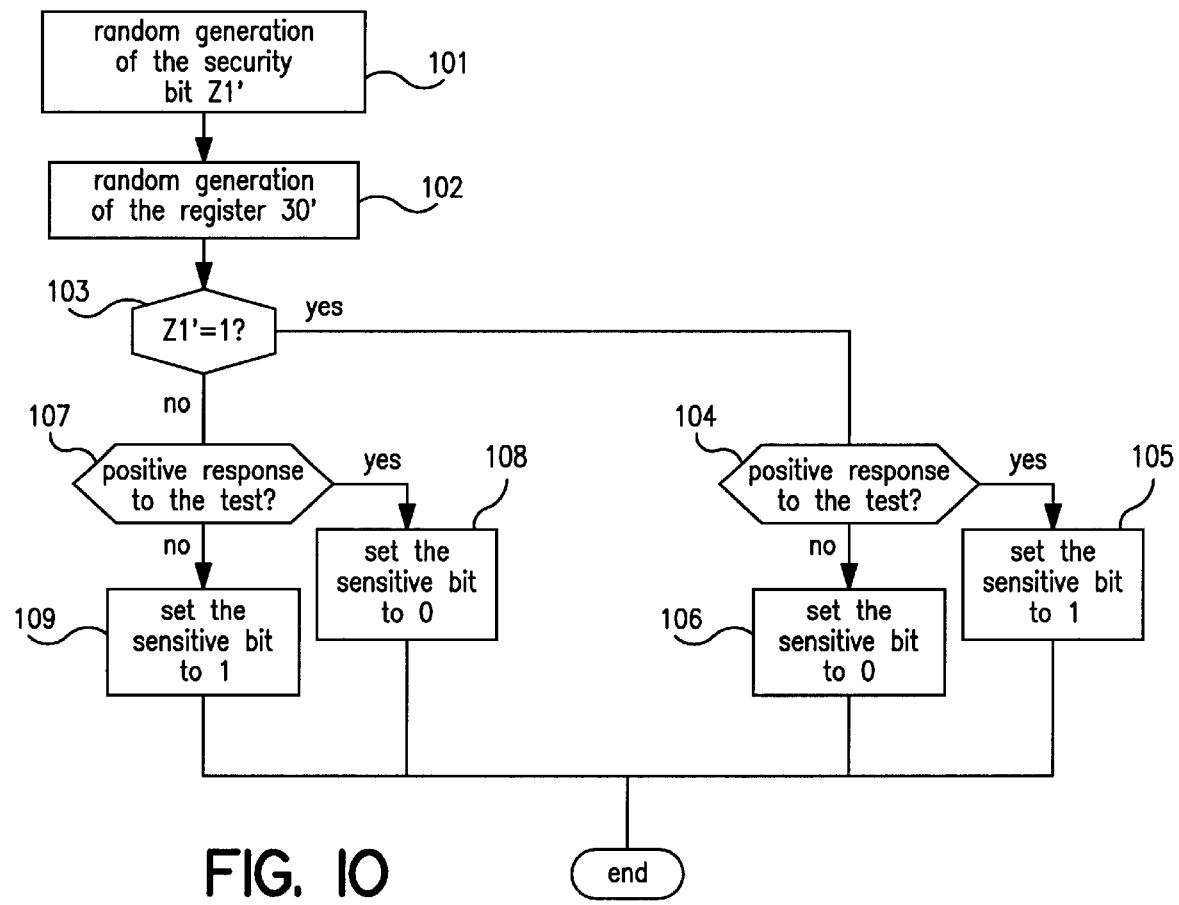
FIG. 10 is a flow chart of an operation for writing a sensitive logical element into the storage register of FIG. 8.

In operation, the microprocessor performs a writing of the sensitive bit S into volatile memory RAM 14, in accordance with the flow chart of FIG. 10. The microprocessor begins by randomly generating the security bit Z1' using a random generator that is known per se and provided in hardware or software form in the security module (step 101). The microprocessor then randomly generates the bit of the register 30' (step 102). Next, the microprocessor analyzes the value of the security bit Z1'. If it is equal to 1, the microprocessor performs a first processing of the response to a test (step 104), which response takes the form of setting the sensitive bit S to zero or to 1. In the event of a positive response, the microprocessor sets the sensitive bit S to 1 (step 105). Naturally, an inverse convention could be applied, in which case a positive response would correspond to setting the sensitive bit S to zero. In the event of a negative response, the microprocessor sets the sensitive bit S to zero (step 106).

If, on the other hand, the bit Z1' equals zero in step 103, the microprocessor performs a second processing of the response to the test, inverse to the first processing. Thus, upon a positive response to the test (step 107), the microprocessor sets the sensitive bit S to 0 (step 108), while in the event of a negative response, it sets it to 1 (step 109).

After setting the sensitive bit S to 1 or to 0 in accordance with steps 105, 106, 108, 109, the microprocessor reaches the end of the operation for writing the sensitive bit S.

After the process for writing the sensitive bit S, the microprocessor typically performs a certain number of tasks before having to read the sensitive bit S. After having read the sensitive bit S (step 111), the microprocessor analyzes the value of the bit Z1'; in the event that Z1'=1, the microprocessor does not modify the read value of the sensitive bit S; on the other hand, in the event that Z1'=0, it complements the read value of the sensitive bit S, i.e., it takes its binary complement (if the read value is 0, it takes the value 1, and if the read value is 1, it takes the value 0). The operation for reading the sensitive bit S is then finished.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A process for the secure processing of a sensitive logical element in a storage register containing several sensitive words, each formed of several sensitive logical elements comprising:

defining a first auxiliary word containing several sensitive logical elements randomly defining a position of one specified sensitive word among other sensitive words of the storage register, which is intended to store said sensitive logical element, and within said one specified sensitive word, the position of one of the sensitive logical elements among the other sensitive logical elements of said one specified sensitive word, the other words of the storage register constituting decoy words;

using the first auxiliary word to select said one specified sensitive word and to store the sensitive logical element in said specified position within said one specified sensitive word.

2. A process according to claim 1, wherein the first auxiliary word contains at least one other logical element randomly defining whether a value to be stored of the sensitive logical element corresponds to a real value of said sensitive logical element or to a logical complement of said real value, and;

in the event that the value to be stored of the sensitive logical element corresponds to the real value of said sensitive logical element, storing said real value; and in the event that the value to be stored of the sensitive logical element corresponds to the logical complement of its real value, storing the logical complement of said real value.

3. A process for the secure processing of a sensitive logical element in a storage register containing several words, each formed of several logical elements, comprising:

defining a first auxiliary word containing several logical elements randomly defining the position of one specified sensitive word among other sensitive words of the storage register, which is intended to store said sensitive logical element, and within said one specified sensitive word, the position of the sensitive logical element among the logical elements of said one specified word, the other sensitive words of the storage register constituting decoy words;

defining a second auxiliary word containing several logical elements randomly defining, for each decoy word in particular, the position of a decoy logical element among the logical elements of this word; and successively considering each of the words of the storage register and randomly assigning for the word considered a value to the logical elements of the second auxiliary word, and in the event that the considered word is a decoy word, using the second auxiliary word to store the decoy logical element in its position, and in the event that said considered word is the sensitive word, using the first auxiliary word to store the sensitive logical element in its position.

4. A process according to claim 3 wherein the first auxiliary word contains at least one other logical element randomly defining whether a value to be stored of the sensitive logical element corresponds to a real value of the logical sensitive element or to a logical complement of the real value, and the second auxiliary word contains at least one other logical element randomly defining whether a value to be stored of the decoy logical element corresponds to a real value of the logical sensitive element or to a logical complement of the real value; and in the event that the value to be stored of the logical element corresponds to the real value of the logical sensitive element, storing said value; and in the event that the value to be stored of the logical element corresponds to the logical complement of its real value, storing the logical complement of the real value.

5. A process according to claim 4 for reading said real value of the stored sensitive logical element, comprising the steps consisting of:

using the first auxiliary word to select the one specified sensitive word in the storage register, selecting in said one specified sensitive word the sensitive logical element, and defining whether a stored value of the sensitive logical element corresponds to the real value of the sensitive logical element or to a logical complement of the real value;

in the event that the stored value of the logical element corresponds to the real value of the logical sensitive element, storing said value; and in the event that the stored value of the logical element corresponds to the logical complement of its real value, reading said value and taking its logical complement.

6. A security module comprising information processing means and information storage means constructed and arranged to perform a secure processing of a sensitive logical element in a storage register containing several words, each formed of several logical elements:

means for defining a first auxiliary word containing several logical elements randomly defining the position of one specified sensitive word among other sensitive words of the storage register, said storage register being adapted to store said sensitive logical element, and within said one specified sensitive word, the position of the sensitive logical element among the logical elements of said one specified sensitive word, the other sensitive words of the storage register constituting decoy words;

means for defining a second auxiliary word containing several logical elements randomly defining, for each decoy word in particular, the position of a decoy logical element among the logical elements of said decoy word;

means for successively considering each of the words of the storage register and randomly assigning for the considered word a value to the logical elements of the second auxiliary word, and in the event that said considered word is a decoy word, using the second auxiliary word to store the decoy logical element in its position, and in the event that said considered word is the sensitive word, using the first auxiliary word to store the sensitive logical element in its position.

* * * * *